United States Patent

[11] 3,628,116

[72] Inventor Fritz K. Preikschat
 16020 Lake Hill Blvd., Bellevue, Wash. 98004
[21] Appl. No. 54,534
[22] Filed July 13, 1970
[45] Patented Dec. 14, 1971

[54] INDUSTRIAL PROCESS CONTROL SYSTEM FOR OPERATIONS WITH LONG TIME CONSTANTS
 16 Claims, 5 Drawing Figs.
[52] U.S. Cl. .................................................. 318/590, 318/257, 318/596
[51] Int. Cl. ........................................................ G05b 11/18
[50] Field of Search ............................................ 318/590, 596, 609, 610, 257

[56] References Cited
UNITED STATES PATENTS
| | | | |
|---|---|---|---|
| 2,777,285 | 1/1957 | McDonald | 318/596 X |
| 2,796,569 | 6/1957 | McDonald et al. | 318/596 X |
| 2,905,877 | 9/1959 | Ciscel | 318/596 X |

Primary Examiner—Benjamin Dobeck
Attorney—Christensen, Sanborn & Matthews

ABSTRACT: A system for providing continuous and proportional control of a process variable includes a sensor furnishing an output signal having an analog value proportional to the process variable. An analog controller includes a shaping circuit comparing that analog value with a reference to develop an error signal, and an integrator and two differentiators in series. The time constant of the integrator is chosen to filter out fast, unwanted fluctuations in the process variable and the time constants of the differentiators to approximate those involved in the process work function. The outputs of these elements of the analog controller are summed and supplied as a control signal to an actuator control circuit which varies the power supplied to an actuator so as to proportionally control a control parameter of the process. In turn, changes in the control parameter bring the process variable back to its desired value. An embodiment of the analog controller uses tantalum capacitors and high impedance operational amplifiers. Embodiments of the actuator control circuits for use with AC synchronous stepping motors and DC motors include an integrator which eliminates any dead band in the actuator's response to the control signal.

Patented Dec. 14, 1971

INVENTOR.
FRITZ K. PREIKSCHAT
BY
Christensen, Sanborn & Matthews
ATTORNEYS

Patented Dec. 14, 1971

INVENTOR.
FRITZ K. PREIKSCHAT
BY
Christensen Sanborn & Matthews
ATTORNEYS

Patented Dec. 14, 1971

INVENTOR.
FRITZ K. PREIKSCHAT
BY
Christensen Sanborn & Matthews
ATTORNEYS

INDUSTRIAL PROCESS CONTROL SYSTEM FOR OPERATIONS WITH LONG TIME CONSTANTS

BACKGROUND OF THE INVENTION

This invention relates to control systems for industrial processes, and more particularly, to such control systems which can provide a critically damped control of processes which include a step or steps having very long time constants.

In industrial process controls, there is generally a variable of the process which is monitored to provide an input signal to a control system which in turn acts to maintain that variable at a preset value or to maintain changes in that variable in accordance with a predetermined schedule. In most industrial processes, there is also a parameter associated with the process which can be controlled by an output signal from the control system to effect changes in the monitored or measured process variable. The manner in which the process variable responds to changes in the process control parameter is known as the process work function and includes both the control function needed to control the process variable and other relations peculiar to the process. This work function may be expressed in terms of a mathematical relationship between the process variable and the process control parameter. The time required for changes in the control parameter to be reflected in the process variable varies with the work function and is known as the cycle time of the process step, or, more simply, as the process time constant. As a simple example, one may consider that the temperature in a large oven used in a baking step of a process is to be controlled within certain limits about a desired value. Accordingly, the process variable is temperature and the control parameter may be the amount of power supplied to the heating coil for the oven.

Control systems have long been known which satisfactorily provide control of processes or process steps having relatively short time constants. For such processes or process steps, control of the process variable has been effected by both analog and digital circuits which provide stepwise, nonlinear, or proportional control thereof by means of changes in the process control parameter.

However, the problems of obtaining accurate and stable operations of a control system when long time constants are involved in the industrial process are different. Heretofore, the control systems known and used in the industry have not been able to provide proportional control of the process variable by means of corresponding control of the process control parameter in the processes having long time constants, with one exception.

The great majority of the prior systems have been strictly mechanical or a combination of mechanical and electromechanical elements. For example, the level of a product stored within a bin can be controlled by varying the flow rate of discharge therefrom. Such a control system would sense the level of the product in the bin, or the process variable, and apply an appropriate control signal to a valve, for instance, which would modify the flow rate of discharge, or the process control parameter. Previously, the bin level has been sensed by a series of load cell switches which provide a corresponding number of signals corresponding to different weights of material in the bin, or by a simple on-off switch arrangement actuated when the product reached a c certain level. Over a relatively long period of time, the systems maintain the bin level at or near a desired value. However, because of their mechanical nature, the type of control is stepwise and discontinuous. In modern, automated process controls, a continuous and generally proportional flow of materials throughout the process is required for successful operation and discontinuous operation of a process step therein cannot be tolerated.

One approach in the prior art for providing continuous control has been to adapt digital circuitry to the control system. Such devices, commonly known as process control computers, can and do provide continuous proportional control of any process step or subprocess. However, these computers are necessarily expensive to install and expensive to maintain. Accordingly, their use is not economically justified for many applications in industry in which a relatively small investment has been placed into the process equipment. Therefore, these types of continuous controls have not been widely used in those applications.

It is therefor an object of this invention to provide a control system which operates to maintain a control parameter of an industrial process or process step at a predetermined value or in accordance with a predetermined schedule, where the industrial process has a long time constant in one or more of its process steps.

It is a further object of this invention to provide such a control system which is inexpensive and simple and which yet provides continuous and proportional control of the process variable.

It is yet another object of this invention to provide such a control system which operates continuously and proportionally, but also in a critically damped fashion, not withstanding the fact that long time constants are involved in the process step or process to which it is applied.

It is another object of this invention to implement such a control system by means of analog components.

SUMMARY OF THE INVENTION

The aforementioned objects and others are achieved, briefly, by a control system which comprises a sensor whose output is directly related to the actual value of the process variable, an analog controller which compares the sensor output with a desired value of the process variable to produce an error signal, and which further operates on that error signal with control circuitry embodying the work function and accompanying time constant of the process to provide therefrom a control signal, and an actuator control circuit responsive to the control signal for providing an output signal to an actuator regulating a process control parameter, the actuator control circuit being able to respond to small values of the control signal from the analog controller so as to effect changes in the process control parameter which are proportionally related to changes in the control signal.

BRIEF DESCRIPTION OF THE DRAWINGS

The invention can perhaps be best understood by reference to the following description taken in conjunction with the accompanying drawings in which.

DESCRIPTION OF A PREFERRED EMBODIMENT

Figure 1:
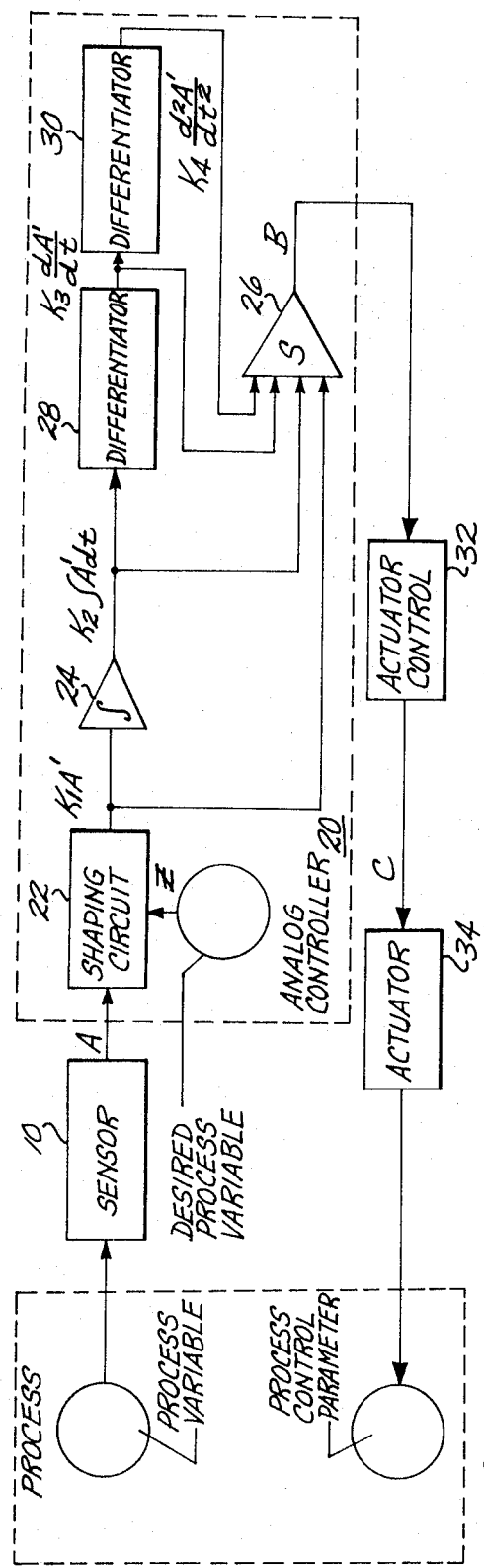
FIG. 1 is a block diagram of the control system of this invention.

With particular reference now to FIG. 1, an industrial process includes a process variable and a process control parameter. It will be recognized by those skilled in the art that the process variable and process control parameter may be associated with a single step of the process, with different steps of the process, or with all the steps of the process. For example, the process variable in the first category may be the level of particulate material within the bin, and the process control parameter, the flow rate of discharge from that bin. In the second case, the process variable may again be the level of particulate material in the bin, but the process control parameter may be the speed of a conveying means which is located at some distance from the discharge exit or the inlet of the bin. In the latter case, the process variable may be the process input, and the process control parameter may be the process output.

In all of these situations, it is desirable that the process variable be maintained constant or varied in accordance with a schedule. In addition, changes in the process variable can be effected by changes in the process control parameter. Finally, the processes under consideration, as more fully detailed hereinafter, have relatively long time constants, that is, the time period or cycle required for changes in the process control parameter to be reflected in changes in the process variable.

Accordingly, the control system of this invention senses the actual state of the process variable and provides therefrom an appropriate controlling signal to the process control parameter, which controlling signal is related to the deviation of the process variable from a desired value and which incorporates therein the work function of the process or process step to bring the process variable to its desired value in a critically damped fashion.

More specifically, the actual value of the process variable is sensed by a sensor 10 which produces an output signal A which is generally proportional to the sensed value. Therefore, the information content including magnitude and sense of the signal A is generally an analog of the process variable.

The output signal A is connected to the input of an analog controller 20 which operates to produce a control signal B when the process variable deviates from a desired value and which operates to restore the process variable to that desired value by means of changes in the process control parameter. Analog controller 20 first includes a shaping circuit 22 which has as its inputs the signal A and a signal Z representing the desired value of the process variable. The function of shaping circuit 22 is threefold: First, any nonlinearities in the signal A are minimized so that signal A is proportional to the actual value of the process variable. Second, the signal A is amplified to a standard level usable with the remaining portions of analog controller 20. Third, a comparison is provided with the desired value of the process variable and an error signal proportional to the difference therebetween is produced therefrom.

In the embodiment of FIG. 1, these three functions are provided by appropriate linearizing elements and by level shifting the value of the signal A. The output signal from shaping circuit 22 is represented as $K_1A'$, where $A'=A-Z$, and $K_1 =$ a constant.

The signal $K_1A'$ is supplied to the input of an integrator 24 and to noninverting input of a summing amplifier 26 upon whose output terminal, the control signal B appears. As will be discussed in more detail hereinafter, integrator 24 may not be required in all applications, for its function is to remove from the error signal $K_1A'$ fluctuations in the process variable which have a shorter cycle time than the time constants of the process or process step which can be controlled through the process control parameter but which fluctuations would tend to mask or obscure true or long time changes in the process variable.

The output from integrator 24 is supplied to a differentiator 28 and to an inverting input of the summing amplifier 26. The function of differentiator 28 is to introduce into the control function a cycle time which is approximately equal to the time constant of the process or process step. In this manner, the system is responsive to the true or desired signal $K_1A'$ which indicates that controlling action is necessary and which in turn acts to operate on the process control parameter in a manner so that the process variable can be brought back to its desired value.

The output of differentiator 28 is connected to a second differentiator 30 and to a second inverting input of summing amplifier 26. The output of differentiator 30 is connected to the third inverting input of summing amplifier 26.

As described in more detail hereinafter, the function of differentiator 30 is to provide the second derivative of the signal $K_1A'$ so that the control of the process variable may proceed in a critically damped fashion.

In short, differentiators 28 and 30 approximate the time constant involved in the work function of the process or process step.

The summation of the outputs from shaping circuit 22, integrator 24 and differentiators 28 and 30 in summing amplifier 26 provides the control signal B which represents, in analog form, a desired value for the process control parameter. This desired value is such as to bring the process variable back to its desired value in a critically damped fashion as determined by the work function of the process or process step associated therewith.

Control signal B is fed to an actuator control circuit 32 which provides therefrom an actuator control signal C which is coupled to an actuator 34 for the process control parameter. Under most conditions, the control system including sensor 10 and analog controller 20 operates to maintain the process variable within very narrow limits of the desired value thereof. In such cases, the control signal B obtained from the analog controller 20 has an analog value which is generally a small fraction of the maximum control signal therefrom. Accordingly, actuator control 32 must be responsive to these small signal levels and yet be able to provide control of actuator 34 so as to smoothly and continuously vary the process control parameter to bring the process variable back to its desired level. In short, actuator control 32 includes components that approximate the relatively short time constant or delay involved in effecting changes in the process control parameter by means of actuator 34, so that there is effectively no dead zone or region of nonoperation about the desired value of the process control parameter. In the embodiment to be hereinafter described, actuator 34 comprises a motor, and actuator control 32 a motor control circuit therefor.

To best understand the operation of the control system just described and the requirements for the functional components thereof and their connections, the types of processes or process steps with which the control system may be used should be examined in some detail.

These processes conveniently may be analyzed in terms of their work function and more particularly in terms of the mathematical relation between the process control parameter and the process variable. First, the process control parameter may be directly proportional to the process variable. Second, the process control parameter may be proportional to the first derivative of the process variable. Third, the process control parameter may be proportional to the second derivative of the process variable. Finally, the process control parameter is related by a complicated mathematical relation to the process variable, including combinations of the first three cases.

An example of the first case is a process step in which the speed of a motor actuator is desired to be directly controlled. In such a case, the measured speed would be the process variable and the input current to the motor would be the process control parameter. Control systems adapted for use with industrial process steps of this type are well known to the art, and it is felt that the applicability of the control system of this invention lies primarily with processes of the remaining types.

One example of the second case would be the control of flow rate through an orifice in which a pinch valve is used as the flow regulating element. Such devices are well known to the art and comprise a compressible, elongated tube whose cross-sectional area is varied by a pinching mechanism which compresses the tube in response to the degree and type of movement of an actuator therefor.

With such valves, the flow rate R is proportional to the cross-sectional area of the tube, with R equaling zero when the tube is closed and equaling $R_{max}$ when the tube is completely open. It is assumed that the flow rate is also linearly proportional to the degree of compression, as represented by the position of the pinching mechanism, a relation between the control signal B supplied to the actuator and the flow rate can be derived. In such a case, the position of the pinching mechanism is given by the integral of the control signal B. Since the flow rate R is assumed to be linearly proportional to the position r, it can thus be seen that the flow rate R is also determined by the integral of the control signal B. Therefore, the control signal B, or the process control parameter, is proportional to the first derivative of the flow rate R, or the process variable.

Another example of the second case is the control of temperature in a large industrial oven. In such ovens, temperature of the oven is generally considered as the process variable and the amount of power supplied to the heating element therefore is generally considered as the process control parameter. Because of the long time involved for the temperature to reach an equilibrium position after a change in the power supplied to the heating element, it has heretofore not been possible to measure the temperature in the oven and to use that measurement as a direct input for the control system. Because these times often reach one-half hour in duration, it has been the practice in some instances to build a smaller cavity within the oven which has a shorter time constant and thus a faster response between changes in the power supplied to the heating element and changes in the oven temperature. Again, the temperature is equal to the integral of the power supplied to the heating element, and thus the power supplied to the heating element, or the process control parameter, is directly proportional to the first derivative of the temperature, or the process variable.

An example of the third case would be control of the level of particulate material in a bin by means of a pinch valve which controls the flow rate discharge therefrom. As previously indicated, the control signal supplied to an actuator for the pinch valve is proportional to the first derivative of the flow rate therethrough. It is also known that the level of particulate material within the bin is directly proportional to the volume of the material within the bin. However, this volume is the integral over time of the flow rate of discharge therefrom. Therefore, the signal supplied to the actuator through the pinch valve, or the process control parameter, is the second derivative of the bin level, or the process variable.

In all of these cases, it is desirable to obtain stable control of the process variable. To insure such control, it has been found that the control system must be sensitive to the rate of change of the process variable. Therefore, for the first type of process noted above, the control system would have to be responsive to both the sum of the actual value of the process variable plus the first derivative thereof. For processes of the second type, the system would have to be responsive to the sum of the process variable, plus the first and second derivatives thereof.

Balanced against this requirement are those considerations which indicate that the electronic circuits used in the control system cannot provide true integration and differentiation in the mathematical sense. For example, capacitors used in both integrators and differentiators leak some charge over a relatively long time period and therefore their characteristics are not constant as a function of applied voltage.

Because of these considerations, it has not been found practical to design a control system for processes or process steps having long time constants from a mathematical standpoint alone. Rather, empirical tests show that for cases where the process control parameter is related to the second or higher derivative of the process variable, stable operation can be provided by making the control system responsive only to the sensed value of a deviation from the desired process variable plus the first and second derivatives thereof.

Therefore, a control system configured as in the embodiment of FIG. 1 can provide stable and critically damped control of most industrial processes or process steps having long time constants. As can be seen, the control signal B is equal to:

$$B = K_1 A' + K_2 \int A \, dt + K_3 \frac{dA}{dt} + K_4 \frac{d^2 A'}{dt^2}$$

In situations where the true value of the process variable is masked by short-term fluctuations thereof, the integrator 24 should be used. The coefficients $K_1$, $K_2$, $K_3$ and $K_4$ are chosen so that the control function of the analog controller 20 approximates the work function of the process or process step so that a critically damped operation is obtained. Choice of these coefficients can be made empirically. It is desirable that the analog controller 20 be able to return the process variable to its desired value as soon as possible but with no hunting, jitter, or other undesirable oscillations. The phrase "critically damped" indicates that such control is achieved with only one oscillation of the process variable about its desired value, and the coefficients should be chosen with this criterion in mind.

Reference will now be made to specific embodiments of the analog controller 20, the actuator control 32, and actuator 34 in order that the invention may be more fully understood.

Figure 2:
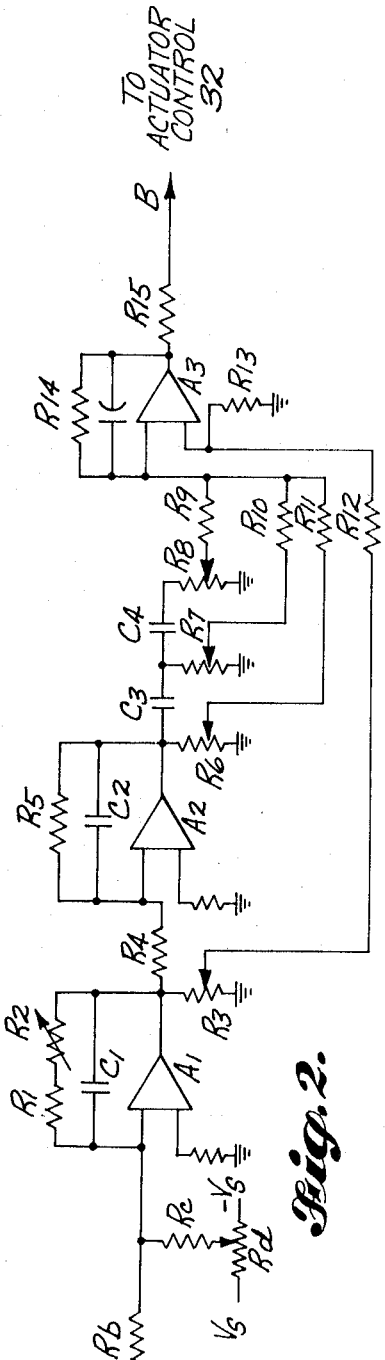
FIG. 2 is a schematic diagram of one embodiment of the analog controller of FIG. 1.

In FIG. 2, the output signal A from sensor 10 is applied across an input resistor $R_a$ of the shaping circuit 22. The voltage developed thereacross is coupled by a limiting resistor $R_b$ to the input of an operational amplifier A1 which is referenced to ground potential and which additionally has as an input a voltage corresponding to the desired value of the process variable. This voltage is obtained through a resistor $R_c$ from the tap of a potentiometer $R_d$ connected between plus and minus terminals of the supply voltage $V_s$. A third input to operational amplifier A1 is provided by a feedback path from the output thereof including the parallel connection of a capacitor C1 and series-connected resistors R1 and R2. The output signal of shaping circuit 22 is developed across potentiometer R3 connected from the output of amplifier A1 to ground potential and a portion thereof, or $k_1 A'$, appears on the tap of potentiometer R3 and is coupled by a resistor R12 to the noninverting input of an operational amplifier A3 which is referenced to ground potential by a resistor R13.

Sensor 10 may comprise any one of a plurality of different sensors, such as thermocouples, capacitive probes, resistive bridges, or the like. What is required is that the signal A be related by some analog to the actual value of the process variable. Resistors $R_a$ and $R_b$ match the impedance presented to the input terminal to the input impedance of operational amplifier A1. The setting of potentiometer $R_d$ provides a bias voltage to the input of operational amplifier A1 so that the operational range of the control system is centered at the desired value of the process variable. In the embodiment of FIG. 2, the process variable maintained at or near a predetermined value by the control system. However, it is also contemplated that the process variable be changed in accordance with a schedule or in response to another control signal of an adjacent process step or an adjacent process, and therefore the bias supplied to the input of operational amplifier A1 could be provided by a varying voltage source.

Variable resistor R2 is used in the feedback loop along with resistor R1 and capacitor C1 to linearize the output signal from amplifier A1 over the desired range of control operation. In addition, the parallel resistance-capacitance combination in the feedback path may be designed to have a relatively short time constant so as to filter out stray noise voltages that may appear on the output of sensor 10.

The output voltage obtained from shaping circuit 22, and more particularly, that which is present at the output terminal of operational amplifier A1, is thus normalized so that it has a reference value when the process variable is at its desired value and has positive and negative values when the process variable is above or below its desired value.

Integrator 24 includes a resistor R4 which couples the output of operational amplifier A1 to the input of an operational amplifier A2 which is referenced to ground potential. A resistor R5 and capacitor C2 are connected in a feedback loop around operational amplifier A2 and the output terminal thereof is connected to ground potential by a potentiometer R6. The tap of potentiometer R6 is in turn connected to an inverting input of operational amplifier A3 by a resistor R11.

As mentioned previously, it is desirable in some applications to remove relatively short term fluctuations in the level of the signal from shaping circuit 22 so as to make the control system responsive only to long term or true changes in the process variable. If these fluctuations were not removed, the control signal B would continuously vary between maximum and minimum limit positions, resulting in undesirable hunting, jitter, and oscillatory movements of the actuator 34. On the other hand, the integrating circuit must have a time constant which is shorter than that of the process and that of differentiators 28 and 30. An integrator such as circuit 24 can cause instability in a control system because the phase of control signals are retarded thereby and therefore the error signal $K_1A'$ is increased instead of reduced for the time period of integrator operation.

On the assumption that the fluctuations in the error signal $K_1A'$ from shaping circuit 22 will have a period of less than 1 minute, and further assuming that the output voltage from amplifier A2 has an amplitude which is 10 percent of the amplitude of the output of amplifier A1, integrator 24 may be constructed according to the values in table I.

TABLE I

| f (Hz.) | C2 ($\mu$F) | R5 (M) | Cycle Time (seconds) |
|---|---|---|---|
| 0.3 | 10 | 1.0 | 3 |
| 0.03 | 100 | 1.0 | 30 |

The output terminal of operational amplifier A2 is connected to differentiator 28 which comprises a capacitor C3 in series with a potentiometer R7. The common point of capacitor C3 and potentiometer R7 is connected to the differentiator 30 which comprises a capacitor C4 in series with a potentiometer R8. The taps of potentiometers R7 and R8 are coupled to the inverting input of operational amplifier A3 by resistors R10 and R9, respectively.

Capacitors C3 and C4, and resistors R7 and R8 have equal values so that the approximate time constants or cycles thereof are equal. Representative maximum cycles or time constants for various values of the differentiator components can be seen from table II.

TABLE II

| C3, C4 ($\mu$F) | R7, R8 (M) | Cycle Time (minutes) |
|---|---|---|
| 100 | 1.0 | 90 |
| 30 | 1.0 | 30 |
| 10 | 1.0 | 10 |

It will be noted that these times vary from ten minutes to ninety minutes. To obtain such long constants with simple circuits such as illustrated in FIG. 2, the leakage of charge from the capacitors C3 and C4 must be controlled.

In a working model, C3 and C4 each comprised tantalum electrolytic capacitors. For use with dual polarity signals such as would be encountered in the circuitry of FIG. 2, two of these electrolytic capacitors were connected in a back-to-back fashion. The tantalum capacitor has a very small leakage current when charged and can be recharged after current reversal by a minimal charging current of less than 1 $\mu$a. In contrast, an aluminum electrolytic capacitor requires a considerably larger initial current to develop such isolation. Moreover, the use of operational amplifiers with very high-input impedances also minimizes the leakage of charge from the capacitors. In the working model, the operational amplifiers comprised integrated circuits having input impedance in the order of a few megohms.

If time constants longer than 90 minutes are desired, the capacitors and operational amplifiers must be chosen more carefully. However, it is possible with devices currently on the market to obtain suitable combinations of high-input impedance and low-capacitor leakage currents so as to extend the time constants.

The output signals from shaping circuit 22, integrator 24, and differentiators 28 and 30 are summed in operational amplifier A3 which also includes a resistor and a capacitor in the feedback loop thereof so as to filter out noise signals from the output thereof, which is coupled through a resistor R15 to actuator control circuit 32.

The setting of the taps of potentiometers R3, R6, R7, and R8 determines the coefficients $K_1$, $K_2$, $K_3$, and $K_4$ in the control function for the analog controller heretofore described. These coefficients must be set so that the control function is critically damped and provides a control signal B which in fact returns the process variable to its desired value as quickly as possible without hunting or oscillation.

A working model was constructed and the component types and values used therein are listed in table III.

TABLE III

| Component | Type and Value |
|---|---|
| Ra | 1 k$\Omega$ |
| Rb | 68 k$\Omega$ |
| Rc | 47 k$\Omega$ |
| Rd | 10 k$\Omega$ |
| R1 | 10 k$\Omega$ |
| R2 | 1 M |
| R3 | 1 M |
| R4 | 1 M |
| R5 | (see Table I) |
| R6 | 1 M |
| R7 | (see Table II) |
| R8 | (see Table II) |
| R9 | 330 k$\Omega$ |
| R10 | 1 M |
| R11 | 4.7 M |
| R12 | 4.7 M |
| R13 | 330 k$\Omega$ |
| R14 | 3.3 M |
| R15 | 10 k$\Omega$ |
| C1 | 0.01 $\mu$f. |
| C2 | (see Table I) |
| C3 | (see Table II) |
| C4 | (see Table II) |
| A1 | CA-3033 (RCA) |
| A2 | CA-3033 (RCA) |
| A3 | CA-3033 (RCA) |

The entire analog controller of FIG. 2 was assembled on a single printed circuit board and provided control accuracies in the range of 0.1 to 1 percent.

The analog value of the control signal B varies from plus to minus $V_s$ for the extreme desired values of the process control parameter, and equals reference potential for no change therein.

The function of actuator control circuit 32 is to convert the desired change in the process control parameter represented by the control signal B into a control signal C for the actuator 34. In almost all cases, the control signal C can be represented by the amount of AC OR DC power supplied by actuator control circuit 32 to actuator 34.

For example, when the actuator 34 is an AC operated device, such as a synchronous or an induction motor, a heating element for an oven, or the like, control is effected by varying the number of cycles of AC power that are supplied to the actuator. In the case of AC motor operated valves, such control results in an adjustment in the direction and speed of operation of the motor so that the valve is moved to intermediate, maximum, or minimum positions thereof. In the case of AC motor operated conveyors, such control results in an adjustment of the speed of rotation of the conveying means. In the case of a heating element for an oven, such control results in an adjustment of the heat delivered thereby. In the cases where there is a limiting position, such as in the case of an AC motor operated valve, the actuator control circuit must also include limit switches to stop the operation of the actuator control circuit 32 when the limit positions are reached.

Where the actuator 34 is a DC operated device, control is effected by varying the duty-cycle of the DC power supplied thereto. In the case where the actuator 34 comprises a DC motor operated valve, for example, such control results in an adjustment in the direction and speed of operation of the DC motor so that the valve varies between maximum, minimum, and intermediate positions.

There are a number of criteria which must be satisfied in order to have a stable control. First, the actuator control circuit 32 must be able to vary the power delivered to the actuator from maximum to minimum values, and in some cases do so bidirectionally. Secondly, the actuator control circuit 32 must be able to modify the amount of power delivered between these values with very high resolution. When industrial processes having long time constants are to be controlled, it is necessary for stable operation that the control signal B be provided for very small deviations of the process variable from the desired value. It is thus essential that the actuator control circuit 32 have a resolution so as to respond to these very small values and accordingly control the amount of power supplied to actuator 34. Third, it is desirable that the actuator 34 be able to change its speed, direction of movement or rotation, or other output in a manner which is proportionally related to the control signal B.

Figure 3:
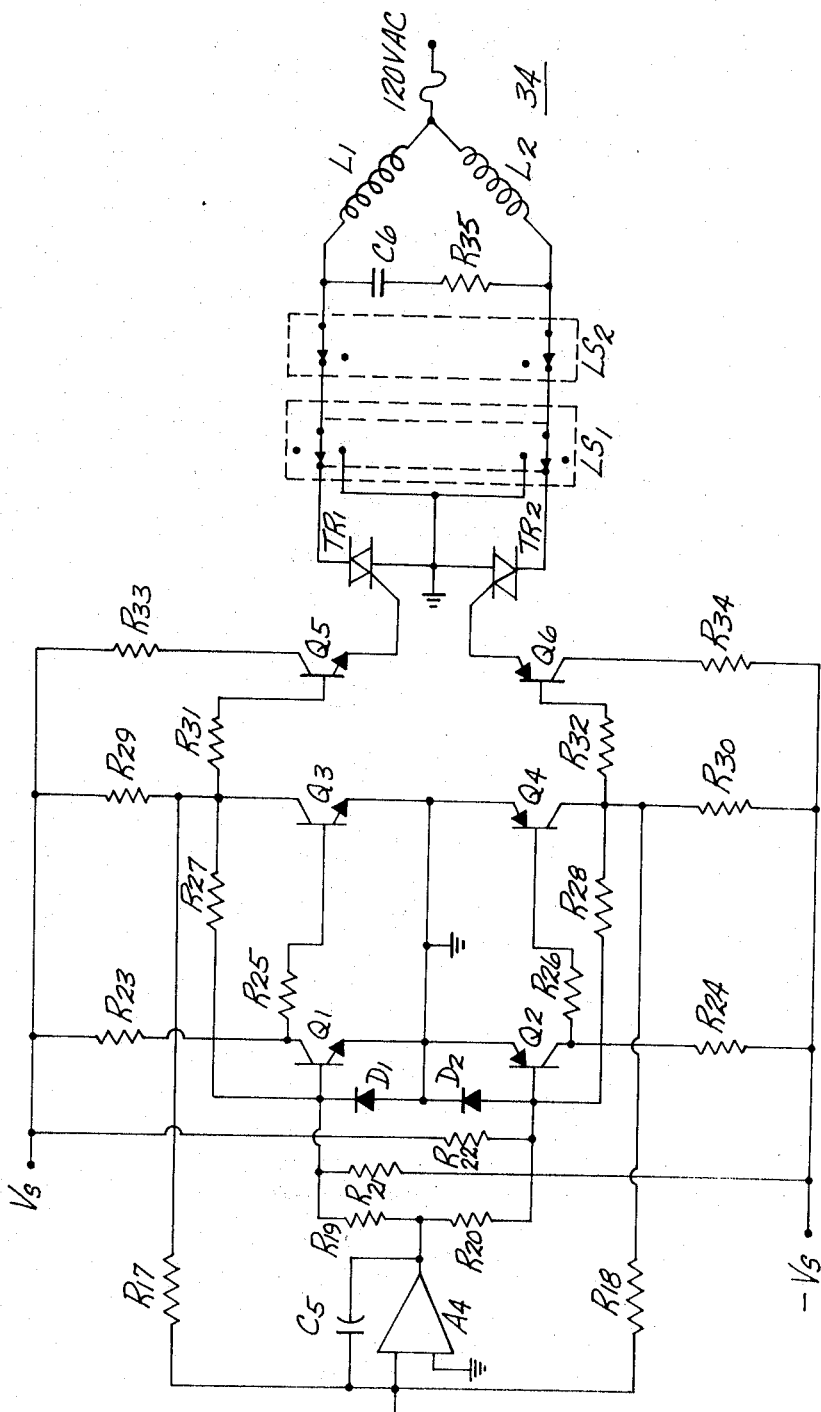
FIG. 3 is a schematic diagram of one embodiment of the actuator control circuit of FIG. 1.

One embodiment of an actuator control circuit which can satisfy these three requirements is illustrated in FIG. 3. This circuit is designed for use with an AC Slo-Syn motor actuator, which is a bidirectional device, but could as easily be applied to the control of nondirectional actuators such as a heating element.

A Slo-Syn motor includes an armature having a plurality of pole pairs and first and second field windings therefor. When AC power is applied across one of the field windings, the armature rotates in incremental steps, the degrees of rotation of each step depending on the number of pole pairs in the armature. In addition, the direction of rotation is determined by which of the field windings is energized, and the speed of rotation is synchronous with the applied AC voltage, i.e., the armature rotates one step for every cycle of the AC voltage.

Because of these properties, the Slo-Syn motor is very adaptable to the bidirectional control of the position of a valve which in turn is used to vary the flow rate of material therethrough.

When the shaft of the Slo-Syn motor is coupled to the valve by a suitable gear reduction mechanism, the actuator may have a resolution per step on the order of $10^{-4}$ the full excursion of the valve from maximum to minimum positions. For use with the control system of this invention, it is sufficient that the resolution be on the order of 0.1 to 1 percent of full excursion so that the motor can be controlled in larger increments of 10 to 100 steps.

To this end, the circuit in FIG. 3 includes an integrator to which the control signal B is coupled and which provides an output signal to first and second control circuits, one for each direction of Slo-Syn motor actuation. The output from each of these control circuits controls the actuation of a bidirectional, controllable semiconductor device which is connected in series with one of the field windings of the Slo-Syn motor across an AC voltage source. In addition, a feedback connection is provided from the output of each control circuit to the input of the integrator to accordingly control the time period of actuation of each bidirectional controllable, semiconductor device.

In more detail, the control signal B from analog controller 20 is applied through a limiting resistor R16 to the inverting input of an operational amplifier A4. A capacitor C5 is connected in the feedback loop of operational amplifier A4, and the output thereof is connected to the inputs of the first and second control circuits.

The first control circuit includes transistors Q1, Q3, Q5, and bidirectional, controllable semiconductor device, or Triac, TR1. The output of operational amplifier A4, or the output of the integrator, is coupled to the base electrode of transistor Q1 by a resistor R19. The base-to-emitter junction of transistor Q1 is shunted by a diode D1, and the emitter of transistor Q1 is coupled to ground potential. The collector of transistor Q1 is connected to the supply voltage $V_s$ by a biasing resistor R23 and is also connected to the base of transistor Q3 by a resistor R25. In turn, the emitter of transistor Q3 is coupled to ground potential, and the collector thereof to the supply voltage $V_s$ by a resistor R29. A second input to transistor Q1 is provided by a resistor R27 coupled to the collector of transistor Q3 and a third input thereto is provided by a resistor R21 connected to the negative supply voltage $-V_s$.

A second input to operational amplifier A4 is provided by a feedback resistor R17 connected to the collector of transistor Q3. The collector of transistor Q3 is also connected to the base of transistor Q5 by a resistor R31. In turn, the collector of transistor Q5 is coupled to the supply voltage $V_s$ by biasing resistor R33 and the emitter thereof is connected directly to the gate electrode of Triac TR1. A field coil L1 of the Slo-Syn actuator is connected at one end to a source of 120 volts AC and at the other end, through appropriate limit switches LS1 and LS2, to a main current-carrying terminal of the Triac TR1. The other main terminal of Triac TR1 is connected to ground potential.

Now, the input signal B has maximum and minimum values of $\pm V_s$. For normally balanced operations, however, the signal B does not usually exceed $\pm 0.1\ V_s$ and generally fluctuates within this range. The function of the integrator is to filter out normally balanced changes of this magnitude from appearing as firing signals to the Triac TR1 but yet to allow the control unit to be responsive to much smaller, unbalanced control signals. In most cases, the design should allow for response to unbalanced input signals smaller than $0.01\ V_s$ which last over a relatively long time interval.

Assuming now that a very small, negative polarity input signal B has been applied to resistor R16, the output of operational amplifier A4 rises from zero or ground potential to the potential of the supply voltage $V_s$ at a rate determined by the time constant of the R16–C5 combination and the magnitude of the input signal. In the case of very small input signals, this integration may take several minutes. As long as the output of operational amplifier A4 is near reference potential, the current applied to transistor Q1 by resistor R19 is very small. Accordingly, resistor R21 connected to the negative supply voltage $-V_s$ maintains transistor Qi in a nonconducting state and diode D1 prevents an excessive reverse-bias on the base to emitter-junction thereof.

With transistor Q1 in a nonconducting state, transistor Q3 is biased by resistors R23 and R25 in a conducting state. Accordingly, the voltage at the collector of transistor Q3 is very low, on the order of $0.02\ V_s$ to $0.05\ V_s$. At this time, transistor Q5, and thus Triac TR1, are maintained in a nonconducting state by virtue of the connection through resistor R31 from the collector of transistor Q3. At the same time, the current feedback from the collector of transistor Q3 to the base of transistor Q1 via resistor R27 is insufficient to place transistor Q1 in a conducting state.

When the small, negative polarity input signal is integrated, the output voltage of operational amplifier A4 rises to the supply voltage $V_s$. When that voltage approaches approximately $0.8\ V_s$, the current through resistor R19 is sufficient to offset the bias provided by resistor R21 and accordingly transistor Q1 is placed in a conducting state. At this time, the voltage at the collector thereof drops to $0.02\ V_s$ to $0.05\ V_s$. Accordingly, transistor Q3 is placed in a nonconducting state so that its collector voltage rises to approximately $0.9\ V_s$. At this time, transistor Q1 is maintained in a conducting state via the feedback loop including resistor R27 and in addition transistor Q5 is placed in the conducting state by the connection through resistor R31. When transistor Q5 turns on, current is supplied through the emitter thereof to the gate of Triac TR1 to place it in the conducting state so that a current path is completed through field winding L1 from the AC source to ground potential.

At this time, the Slo-Syn motor begins to rotate in the direction determined by the polarity of field winding L1. The number of cycles of AC power supplied to field winding L1 is determined by the feedback path including resistor R17. When transistor Q3 is placed in the conducting state, a positive voltage is applied across resistor R17 to supply current to the input of operational amplifier A4 which tends to offset the negative input signal supplied through resistor R16. Therefore, the output voltage of operational amplifier A4 drops at a rate determined by the time constant of the R17–C5 combination. During the time when the output voltage of operational amplifier A4 is decreasing, transistor Q1 is maintained in a conducting state by the feedback loop including resistor R27. However, when the output voltage of operational amplifier A4 drops to approximately 0.1 $V_s$, the current through resistors R19 and the feedback current through resistor R27 are not sufficient to offset the bias supplied through resistor R21 and therefore transistor Q1 is placed again in a nonconducting state. Similarly, transistor Q3 is placed in a conducting state and transistor Q5 and Triac TR1 in a nonconducting state.

At such a time, power is removed from the field winding L1, and the Slo-Syn motor ceases to rotate.

With this circuit, the minimum time in which power is supplied to the field winding L1 of the Slo-Syn motor, or the minimum "on" time, is determined by the magnitude of the voltage applied across resistor R17 and the time constant of the R17–C5 combination. This time constant cannot be made shorter than one cycle of the AC voltage which is available to drive the Slo-Syn motor, for it must be remembered that such motors make one step for every cycle of the applied voltage thereacross. It is preferable that this time constant provide a resolution which is equal to the control accuracy of the entire control system, which, as stated before, is approximately 1 percent. Therefore, the time constant of the R17–C5 combination should not be longer than 1 percent of the time constant involved in the process or process step, or that embodied in the time constant of the analog controller 20 used in differentiators 28 and 30. In such a case, the minimum "on" time of the control circuit results in perhaps 10 to 100 steps of the Slo-Syn actuator which, through suitable gear reduction, could be made to provide a desired minimum position change in the control valve.

For larger magnitudes of input signal, the relation of the "on" and "off" times changes, as the "on" times become longer and the "off" times become shorter. At approximately −0.8 $V_s$, in the case of negative polarity input signals, the Triac TR1 is continuously energized and the Slo-Syn motor accordingly driven continuously in one direction. The value of the input resistor R16 must therefore be chosen so that for a maximum value of the control signal B, the Triac TR1 is continuously energized. In such a case, the current supplied by the feedback resistor R17 is not sufficient to offset the signal supplied from resistor R16 so that the output of the operational amplifier A4 remains at the maximum value.

The control circuit works in an identical manner for positive polarity control signals B, with the exception that transistors Q2, Q4, Q6, forming a part of the second control circuit along with their associated resistive components, actuate Triac TR2 which is connected in series with the other field winding L2 of the Slo-Syn motor.

Capacitor C6 and resistor R35 connected across field windings L1 and L2 function as a phase-shifting network. Limit switch LS1 is provided for overriding manual operation of the Slo-Syn motor and provides for bypassing Triacs TR1 and TR2 when it is desired to rotate the Slo-Syn motor in either of the two directions. Limit switch LS2 is responsive to the position of the Slo-Syn motor shaft and operates to break the connection to ground through either Triacs TR1 or TR2, or limit switch LS1 when the Slo-Syn shaft is driven to one of its extreme positions.

A working model of the circuit in FIG. 3 was constructed using the component types and values illustrated in table IV.

TABLE IV

| Component | Type and Value |
|---|---|
| R16 | 1 M |
| R17 | 1 M |
| R18 | 1 M |
| R19 | 150 KΩ |
| R20 | 150 KΩ |
| R21 | 220 KΩ |
| R22 | 220 KΩ |
| R23 | 10 KΩ |
| R24 | 10 KΩ |
| R25 | 500 KΩ |
| R26 | 500 KΩ |
| R27 | 150 KΩ |
| R28 | 150 KΩ |
| R29 | 10 KΩ |
| R30 | 10 kΩ |
| R31 | 100 kΩ |
| R32 | 100 kΩ |
| R33 | 1 kΩ |
| R34 | 1 kΩ |
| R35 | 250 Ω |
| C5 | 1 μf., double pole tantalum electrolytic |
| C6 | 3.3 μf. |
| D1 | IN 462 |
| D2 | IN 462 |
| Q1 | 2N5223 |
| Q2 | 2N5223 |
| Q3 | 2N5223 |
| Q4 | 2N5227 |
| Q5 | 2N5227 |
| Q6 | 2N5227 |
| TR1 | RCA 40529 |
| TR2 | RCA 40529 |
| A4 | CA–3033 (RCA) or CA–3047 |

As with the analog controller 20, it can be noted that the capacitor C5 comprises a double pole tantalum electrolytic capacitor and the operational amplifier A4 a high impedance integrated circuit so that leakage of charge from the capacitor C5 was minimized.

Figure 4:
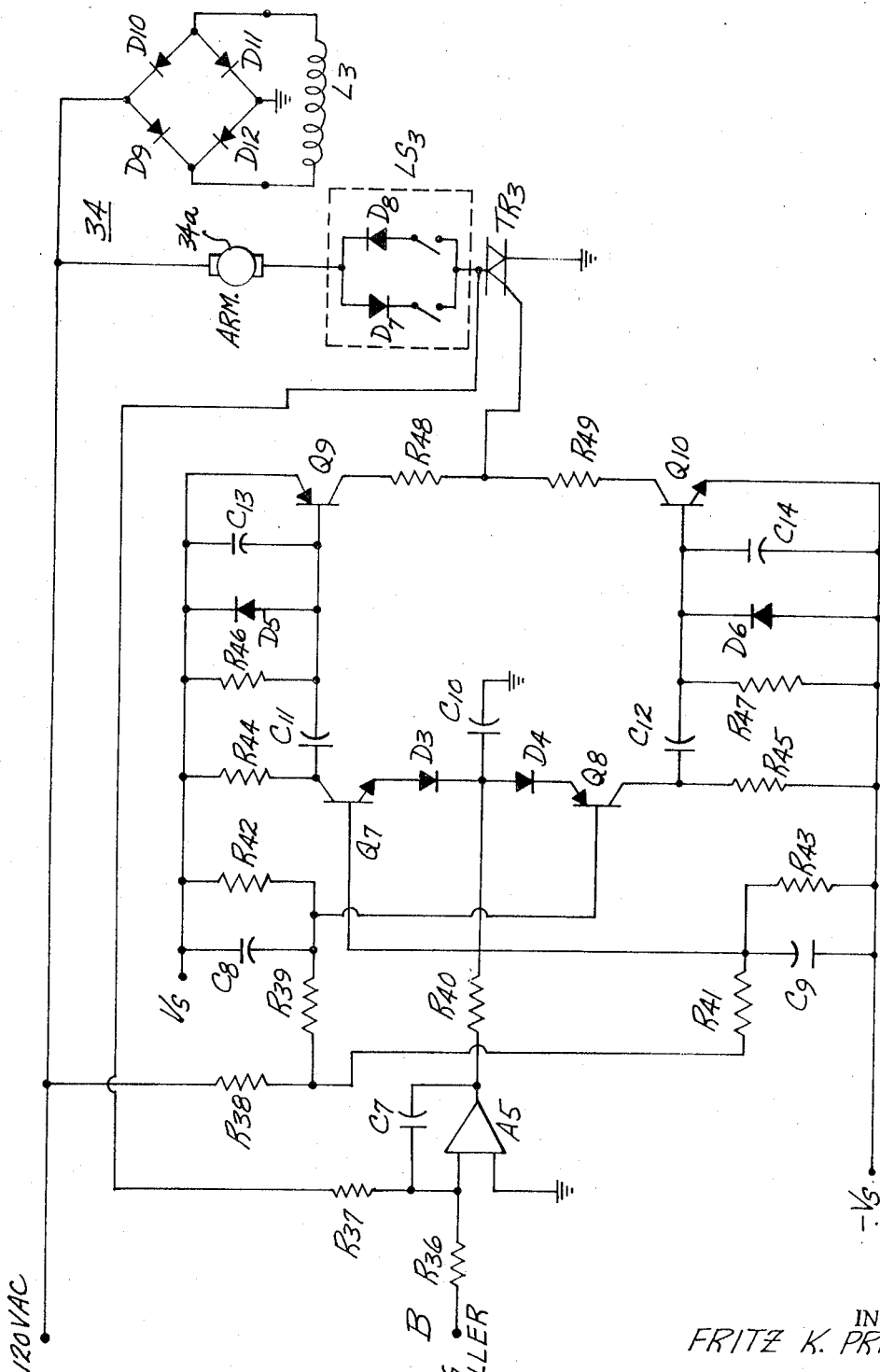
FIG. 4 is a schematic diagram of another embodiment of the actuator control circuit of FIG. 1.

When the actuator 34 comprises a DC motor, for example, the embodiment of actuator control circuit 32 shown in FIG. 4 may be used. The basic elements of this circuit are similar to those in the embodiment of FIG. 3 and comprise an integrator, first and second control circuits coupled thereto which provide an output signal denoting the desired period of conduction of a bidirectional controllable semiconductor device or Triac, the DC motor, and a limit switch in circuit with the DC motor and the bidirectional controllable semiconductor device. In this instance, however, only a single Triac is actuated by the output signals from the first or second control circuits to apply power across the DC motor for selected portions of alternate half-cycles of an AC voltage source.

As with the AC actuator control circuit of FIG. 3, the control signal B from analog controller 20 is first connected to an integrator. In FIG. 4, this integrator includes a resistor R36 which couples the control signal B to the inverting input of an operational amplifier A5 which is referenced to ground potential. Capacitor C7 is connected in the feedback loop around operational amplifier A5, and the output of operational amplifier A5 is coupled by a resistor R40 to the common junction of a capacitor C10 and first and second diodes D3 and D4. The other terminal of capacitor C10 is connected to ground potential. This common junction serves as the input to both the first and second control circuits in FIG. 4.

A second input to the operational amplifier A5 is provided by a feedback voltage from the DC motor 34. In particular, the motor includes an armature 34a whose one terminal is connected to one side of a 120 volt AC source and whose other terminal is connected to ground potential through a limit switch LS3 and a Triac TR3. The common junction between Triac TR3 and limit switch LS3 provides a well-known back EMF voltage whose magnitude is proportional to the speed of the armature and is connected by a resistor R37 to the inverting input of operational amplifier A5.

The circuit of FIG. 4 provides speed control of the DC motor 34 by applying appropriate triggering pulses to Triac TR3 at desired points on alternate half-cycles of the 120 volt AC waveform across armature 34a. These triggering pulses are derived by the first and second control circuits in which a level-shifted, phase-shifted AC waveform is compared in magnitude with the integrated control signal appearing at the common junction between C10 and D3, D4.

The following description will consider only the first control circuit, as the second control circuit is identical thereto.

The level-shifted, phase-shifted AC waveform is derived from the 120 volt AC source by a voltage divider network including resistors R38 and R41 and a capacitor C9 which are connected in series between the 120 volt AC source and the negative supply voltage $-V_s$. The voltage thus appearing at the common junction of resistor R41 and capacitor C9 is a sinusoidal waveform. For purposes of explanation only, this waveform has a peak-to-peak voltage variation of ±3 volts. In addition, a resistor R43 is connected from the common junction of resistor R41 and capacitor C9 to the negative voltage supply $-V_s$ and adds to this sinusoidal waveform a negative bias of approximately —4 volts. This common junction is coupled directly to the control electrode of a transistor Q7 in the first control circuit.

Therefore, the voltage at the base of transistor Q7 is a sinusoidal waveform which is delayed by 90° in phase from the AC waveform supplied across armature 34a, and which has a maximum peak value of —1 volt and a minimum peak value of —7 volts. Plots of the waveforms across armature 34a and the voltage $V_b$ supplied to the base electrode of transistor Q7 can be seen in FIGS. 5a and 5b, respectively.

The emitter of transistor Q7 is connected to diode D3 and the collector thereof is coupled by a capacitor C11 to the base of a transistor Q9. In addition, resistor R44 connects the collector of transistor Q7 to the voltage supply $V_s$ and resistor R46, diode D5, and capacitor C13 couple the base of transistor Q9 to $V_s$. Finally, the emitter of transistor Q9 is connected directly to $V_s$.

The collector of transistor Q9 serves as the output of the first control circuit and is connected by a resistor R48 to the gate electrode of Triac TR3.

Figure 5:
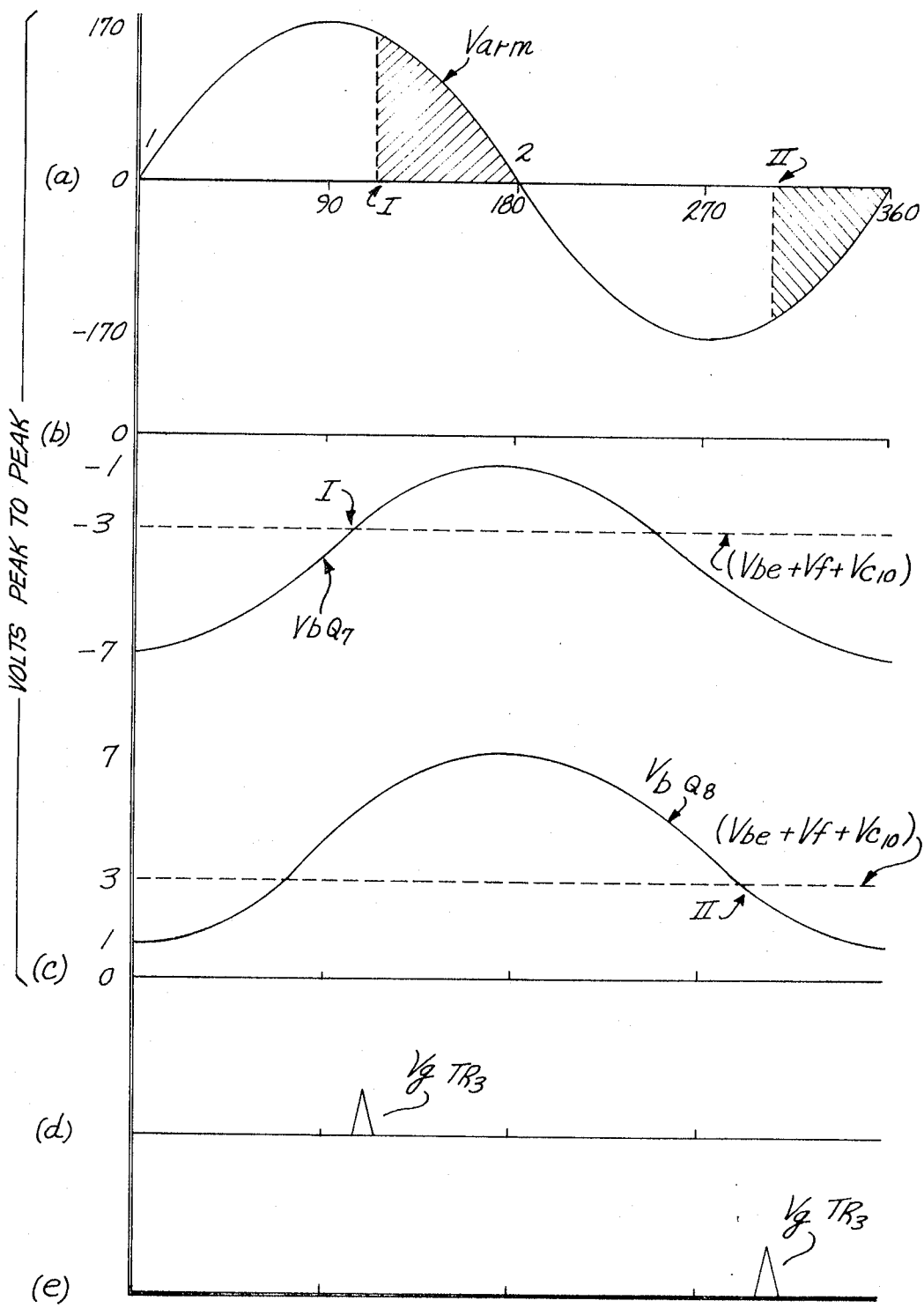
FIG. 5 is a timing diagram illustrating the operation of the circuit of FIG. 4.

With particular reference now to FIG. 5, the first control circuit is designed to actuate the Triac TR3 during positive polarities of the voltage waveform $V_{arm}$ applied across armature 34a.

When control signal B is zero, the output of operational amplifier A5 is at reference potential. In this situation, the voltage at the emitter of transistor Q7 is also at ground potential. In the embodiment of FIG. 4, transistor Q7 is a PNP-type and therefore requires a signal polarity on its base which is relatively positive with respect to that on its emitter in order for the transistor to be placed in a conducting state. It can therefore be seen that if the voltage at the emitter thereof is at ground potential, transistor Q7 is maintained in a nonconducting state because the voltage at the base thereof, as represented by the curve in FIG. 5b, has a maximum value of —1 volt.

When the control signal B has some positive magnitude, the output of the integrator appearing as the output of operational amplifier A5 rises gradually in a manner similar to that previously described for the integrator of FIG. 3. With a positive control signal B, the output of operational amplifier A5 gradually becomes more negative. Accordingly, the voltage at the common junction of diode D3 and capacitor C10 decreases. Transistor Q7 is then triggered into a conducting state when the voltage on the emitter thereof decreases to a value less than the voltage on the base thereof minus the base-to-emitter drop, or $V_{be}$. The voltage on the emitter of Q7 is equal to the forward voltage drop of diode D3, or $V_f$, plus the voltage across capacitor C10, or VC10. In FIG. 5b, this point occurs at —3 volts and transistor Q7 is placed in the conducting state at I.

At this time, capacitor C11 is provided with a charge path through transistor Q7, diode D3 and capacitor C10 to ground potential. The resultant charging pulse provides a current to the base of transistor Q9 which places that transistor in a conducting state. At this time, a current pulse is developed in resistor R48, as best illustrated in FIG. 5d, and applied to the gate of Triac TR3 to place it in a conducting state. Power is then supplied to the armature 34a for the remainder of the positive half-cycle, as best illustrated by the shaded portion of FIG. 5a. Transistor Q7 remains in a conducting state until the voltage at the base thereof decreases below —3 volts. However, capacitor C11 is discharging and therefore transistor Q9 is turned off. Therefore, Triac TR3 is placed in a nonconducting state when the voltage $V_{arm}$ thereacross passes through its zero crossover point.

Speed regulation is achieved through the back EMF voltage from armature 34a. This voltage always has a polarity which is opposite to the sense of the control signal B. Therefore, the signal supplied to the input of operational amplifier A5 is gradually decreased until a regulated operating point is achieved, due to the feedback connection through R37. If the DC motor is controlling a position device, such as a valve, the voltage on the output of operational amplifier A5 is gradually reduced to zero as the device nears its desired position and the process variable is returned to its desired value. If the DC motor is controlling a continuously operating device, such as a conveyor, the output voltage from the operational amplifier A5 is reduced to a stable value.

Diode D3 blocks reverse breakdown current through the base-to-emitter junction of transistor Q7 when the reverse bias voltage thereacross exceeds a certain magnitude, e.g., 5 volts. This condition will occur when the output of operational amplifier A5 has a positive polarity. Diode D5 provides a discharge path for capacitor C11 when transistors Q7 and Q9 are placed in a nonconducting state. Resistor R46 and capacitor C13 block the generation of high frequencies by transistor Q7 and Q9 through parasitic feedback loops.

The second control circuit includes transistors Q8 and Q10 and operates in an identical manner to actuate Triac TR3 during negative half-cycles of the voltage waveform $V_{arm}$. Accordingly, transistor Q8 responds to positive output signals from operational amplifier A5. Waveforms illustrating the operation of the second control circuit can be seen in FIGS. 5c and 5e, in which Triac TR3 is fired at the crossover point II.

By comparing curves 5b and 5c, it can be seen that there is a dead zone of approximately 2 volts, which extends from +1 volt to —1 volt, in which neither of the control circuits respond to output signals from operational amplifier A5. This dead zone is necessary to prevent the Triac TR3 from being fired on both half-cycles of a single cycle of the waveform VR or to prevent firing thereof by the positive polarity, first control circuit during negative half-cycles, and vice versa.

The dead zone at the input to the control circuits is necessary because it is very difficult to accurately maintain the voltages at the bases and emitters of transistors Q7 and Q8 so that there is no overlap. The level of these voltages are always subject to thermal drift in the circuit components and additionally depends to some extent upon the accuracy of the component values. If normal components with normal tolerances are to be used in the design, it is necessary to have such a dead zone.

However, the overall actuator control circuit 32 has no dead zone. That is, the integrator including operational amplifier A5 responds to very small unbalanced values of the control signal B and eventually provides therefrom an output voltage which has a magnitude sufficient to trigger one of the transistors Q7 or Q8. This point occurs when the voltage across capacitor C10, plus the base-to-emitter drop of either transistor Q7 or Q8, plus the forward voltage drop of diodes D3 or D4, exceeds ±1 volt.

As a result, the circuit in FIG. 4 is well suited for use with processes or process steps having relatively long time constants. The time constant of the integrator represented by the R36–C7 combination should be selected for a value less than 1 percent of the process and system time constant.

The remaining components of the actuator control circuit in FIG. 4 include a full-wave rectifier which comprises diodes D9, D10, D11 and D12 connected in a bridge configuration to supply DC power to a field winding L3 of the DC motor 34 from the 120 volt AC source. Where the DC motor is to be used to set the position of the variable setting device, such as a pinch valve, a limit switch LS3 may be interposed in the connection between armature 34a and Triac TR3. Limit switch LS3 includes the parallel connection of two series branches comprising diodes D7 and D8 and two pairs of limit switch contacts. Normally, the limit switch contacts are closed and power alternately flows through the series branches on successive half-cycles of the voltage $V_{arm}$. When the motor reaches one of its limit positions, the corresponding limit switch contacts open to break the current path through the corresponding series branch. Thus, if the DC motor 34 were running in a forward direction and the polarity of the voltage $V_{arm}$ was positive, the limit switch contacts in series with diode D7 would open. The other series branch including diode D8 thereafter provides a discharge path for the transients generated upon the opening of the limit switch contacts.

A working model of the circuit in FIG. 4 was constructed and included the component types and values listed in table V.

TABLE V

| Component | Type and Value |
| --- | --- |
| R36 | 1 M |
| R37 | 12 M |
| R38 | 100 kΩ |
| R39 | 20 kΩ |
| R40 | 2 kΩ |
| R41 | 20 kΩ |
| R42 | 33 kΩ |
| R43 | 33 kΩ |
| R44 | 100 kΩ |
| R45 | 100 kΩ |
| R46 | 22 kΩ |
| R47 | 22 kΩ |
| R48 | 100 Ω |
| R49 | 100 Ω |
| C7 | 1 μf., double pole, tantalum electrolytic |
| C8 | 1 μf. |
| C9 | 1 μf. |
| C10 | 1 μf., double pole tantalum electrolytic |
| C11 | 0.05 μf. |
| C12 | 0.05 μf. |
| C13 | 800 pF. |
| C14 | 800 pF. |
| D3 | IN 462 |
| D4 | IN 462 |
| D5 | IN 462 |
| D6 | IN 462 |
| D7 | 200 V 2A power |
| D8 | 200 V 2A power |
| D9 | |
| D10 | 200 V 1A bridge |
| D11 | rectifier |
| D12 | |
| Q7 | 2N3904 |
| Q8 | 2N3906 |
| Q9 | 2N4401 |
| Q10 | 2N4403 |
| TR3 | 40526 (RCA) |
| A5 | CA-3033 (RCA) |

In this model, the velocity of the DC motor was controlled from approximately 0.2 to 1,700 r.p.m., that is, over a range of nearly $1:10^4$.

As briefly discussed heretofore, the DC actuator control circuit which is taught in FIG. 3 can be used with practically any AC actuator. Where the actuator can provide bidirectional operation, the embodiment of FIG. 3 may be used without any significant modification. Where the actuator is unidirectional, such as an induction motor or a heating coil, only the integrator, first control circuit, and first Triac are needed for successful operation.

In both of the actuator control circuits heretofore described, the integrator comprises an operational amplifier having a capacitor in the feedback loop thereof, an input or limiting resistor which couples the control signal B to the input of the operational amplifier, and a feedback resistor which feeds back a voltage which has a polarity opposite to that of the control signal B. In both of these circuits, the time constant of the feedback resistor and capacitor combination should be chosen to make the resolution of the actuator control circuit, or the minimum "ON" time of the AC control circuit, equal to control the process control system. In addition, the value of the input or limiting resistor must be chosen so that for the maximum value of the control signal B, the actuator is continuously energized. This value may be chosen from the following relation:

$$R_L = R_F \times (V_{Bmax}/V_F)$$

where $R_L$ equals the value of the input resistor, $R_F$ equals the value of the feedback resistor, $V_{Bmax}$ equals the maximum value of the control signal B, and $V_F$ equals the magnitude of the feedback voltage.

While this invention has been described in terms of a number of preferred embodiments thereof, it is to be clearly understood by those skilled in the art that the invention is not limited thereto, but rather is bounded only by the limits of the appended claims.

What is claimed is:

1. A system for use with a process including a process variable and a process control parameter which is related to said process variable by a defined work function, said work function including a relatively long time constant, comprising:
    a. a sensor furnishing an output signal which is proportionally related to the actual value of said process variable,
    b. an analog controller including
        i. first means comparing said output signal with a desired value therefor and producing an error signal proportional to any difference therebetween, and
        ii. second means operating on said error signal to produce a control signal which varies in accordance with said work function,
    c. an actuator controlling said process control parameter in response to an input signal, and
    d. an actuator control circuit which is responsive to small values of said control signal to produce said input signal for said actuator.

2. A system as recited in claim 1, wherein said second means of said analog controller operates on said error signal with the work function $$B = K_1 A' + K_3 \frac{dA'}{dt} + K_4 \frac{d^2 A'}{dt^2},$$

where $B$ = the analog value of said control signal, $A'$ = the analog value of said error signal, and $K_1$, $K_3$ and $K_4$ are constants whose values are chosen so that changes in said process control parameter return said process variable to its desired value in a critically damped manner.

3. A system as recited in claim 2, wherein said second means comprises:
    a. a first differentiating circuit producing from said error signal a first derivative signal,
    b. a second differentiating circuit producing from said first derivative signal a second derivative signal, said first and said second differentiating circuit each having a time constant equal to that of the process work function, and
    c. means summing said error signal, said first derivative signal, and said second derivative signal to produce said control signal.

4. A system as recited in claim 3, wherein:

a. each of said first and second differentiating circuits comprises a bipolar tantalum capacitor and a resistor connected in series, and b. said summing means comprises an operational amplifier having a very high input impedance.

5. A system as recited in claim 1, wherein said second means of said analog controller operates on said error signal with the work function $$B = K_1 A' + K_2 \int A' dt + K_3 \frac{dA'}{dt} + K_4 \frac{d^2 A'}{dt^2},$$

where $A'$ equals the analog value of said error signal, $B$ equals the analog value of said control signal, and $K_1$, $K_2$, $K_3$ and $K_4$ are constants whose values are chosen so that changes in said process control parameter return said process variable to its desired value in a critically damped manner.

6. A system as recited in claim 5, wherein said second means comprises:

a. an integrating circuit producing from said error signal an integral signal, b. a first differentiating circuit producing from said integral signal a first derivative signal, c. a second differentiating circuit producing from said first derivative signal a second derivative signal, the time constants of said first and said second differentiating circuits being equal to that of the process work function and the time constant of said integrating circuit being closer to filer undesired short-term variations from said error signal and being no longer than 10 percent of the time constants of the process work function, and d. means summing said error signal, said integral signal, said first derivative signal, and said second derivative signal to produce said control signal.

7. A system as recited in claim 6 wherein:

a. each of said first and said second differentiating circuits comprises a bipolar tantalum capacitor and a resistor connected in series, b. said summing means comprises an operational amplifier having a very high input impedance, and c. said integrating circuit comprises an operational amplifier and a bipolar tantalum capacitor, said capacitor being connected in a feedback loop around said operational amplifier.

8. A system as recited in claim 1, wherein said actuator control circuit comprises:

a. an integrator including an operational amplifier having input and output terminals and a very high input impedance, a capacitor connected in a feedback loop between said input and said output terminals, an input resistor coupling said control signal to said input terminal, and a feedback resistor having one side thereof connected to said input terminal, b. a control circuit having input and output terminals, said input terminal being connected to the output terminal of said operational amplifier, said control circuit being operative to provide a pulse on its output terminal when the signal on said input terminal thereof exceeds a predetermined value, c. an AC voltage source, d. a bidirectional, controllable semiconductor means having a pair of main, current-carrying terminals and a control terminal and operative to allow current between said main terminals only for the portion of a half-cycle of an AC waveform which follows the application of a control signal to said control terminal, e. means connecting said main terminals of said bidirectional, controllable semiconductor means in series with said actuator across said AC voltage source, f. means connecting said output terminal of said control circuit to said control terminal of said semiconductor means, g. means developing a feedback voltage whose polarity is opposite to that of said control signal, h. means connecting said feedback voltage to the other side of said feedback resistor, the time constant of said feedback resistor and said feedback capacitor being chosen to determine the minimum period of conduction of said bidirectional, controllable semiconductor means and the values of said feedback voltage and said input resistor being chosen so that for the maximum expected value of the control signal, said bidirectional, controllable semiconductor means is continuously conducting.

9. A circuit for providing continuous control of an AC actuator which includes a control element, in response to a control signal without any deadband, comprising:

a. an integrator including an operational amplifier having input and output terminals and a very high input impedance, a capacitor connected in a feedback loop between said input and said output terminals, an input resistor coupling the control signal to said input terminal, and a feedback resistor having one side thereof connected to said input terminal, said integrator being operative to provide an integral signal from said control signal whose slope is determined by the time constant of said input resistor and said feedback capacitor, b. a first control circuit having input and output terminals, said input terminal being coupled to said output terminal of said operational amplifier, said first control circuit being operative to first provide an output terminal whose polarity opposes that of said integral signal when said integral signal exceeds a first value which is less than its maximum expected value, said first control circuit ceasing to provide said output signal when said integral signal decreases below a second, lower value, c. a first bidirectional, controllable semiconductor means which has a pair of main, current-carrying terminals and a control terminal and which is operative to allow current between said main terminals only for the portions of a half-cycle of an applied AC waveform which follows the application of a signal to said control terminal, d. an AC voltage source, e. means connecting said main terminals of said first bidirectional, controllable semiconductor means in series with the control element of said actuator across said AC voltage source, f. means coupling said output terminal of said first control circuit to said control terminal of said first bidirectional, controllable semiconductor means, and g. means connecting the other side of said feedback resistor to said output terminal of said first control circuit.

10. A circuit as recited in claim 9, wherein said feedback capacitor comprising a tantalum capacitor and said first bidirectional, controllable semiconductor means comprises a Triac.

11. A circuit as recited in claim 9, for use with an AC actuator comprising a bidirectional synchronous stepping motor having first and second field windings, and wherein the control signal varies proportionally between positive and negative maximum values for desired energizations of the first and second field windings, respectively:

a. wherein, said operational amplifier inverts the polarity of the control signal applied thereto and wherefor said first control circuit responds to positive values of said integral signal and said bidirectional, controllable semiconductor means is connected in series with the second field winding of the actuator, and b. further comprising 1, a second control circuit having input and output terminals, said input terminal being coupled to said output terminal of said operational amplifier, said second control circuit being operative to first provide an output signal on its output terminal whose polarity opposes that of said integral signal when said integral signal exceeds a predetermined negative value which is less than its maximum negative value, said second control circuit ceasing to provide said output signal when said integral signal decreases below a second, lower negative value thereof, 2. a second bidirectional, controllable semiconductor means having a pair of main, current-carrying terminals and a control terminal,
3. means connecting said main terminals of said second bidirectional, controllable semiconductor means in series with the first field winding of said actuator across said AC source,
4. means coupling the output terminal of said second control circuit to said control terminal of said second bidirectional, controllable semiconductor means, and
5. a second feedback resistor connected from said output terminal of said second control circuit to said input terminal of said operational amplifier.

12. A circuit as recited in claim 11, wherein said feedback capacitor comprises a tantalum capacitor and said first and second bidirectional, controllable semiconductor means comprise Triacs.

13. The system as recited in claim 12, further comprising first and second limit switches interposed between said first and second field windings and said second and first Triacs, respectively.

14. A circuit for providing bidirectional speed control of a DC motor which includes an armature from an AC source, in response to a control signal without any deadband, comprising:
a. an integrator including an operational amplifier having input and output terminals and a very high-input impedance, a capacitor connected in a feedback loop between said input and said output terminals, an input resistor coupling the control signal to said input terminal, and a feedback resistor having one side thereof connected to said input terminal, said integrator being operative to provide an integral signal from the control signal whose polarity is opposite thereto and whose slope is determined by the time constant of said input resistor and said feedback capacitor,
b. an AC voltage source including one terminal which defines a reference level thereof,
c. first means developing from said AC voltage source a first waveform whose phase is delayed 90° therefrom and whose level is always below that of said reference level,
d. second means developing from said AC voltage source a second waveform whose phase is delayed 90° therefrom and whose level is always above that of said reference level,
e. third means providing a first trigger pulse whenever the level of said first waveform exceeds that of said integral signal,
f. fourth means providing a second trigger pulse whenever the level of said second waveform is less than that of said integral signal,
g. a bidirectional, controllable semiconductor means having a pair of main, current-carrying terminals and a control terminal which is operable to allow current between said main terminals only for the portion of a half-cycle of an applied AC waveform which follows the application of a pulse to said control terminal,
h. means connecting said main terminals of said bidirectional, controllable semiconductor means in series with the armature of the DC motor across said AC voltage source,
i. means coupling said first and said second trigger pulses to said control terminal of said bidirectional, controllable semiconductor device, and
j. means connecting the common junction of the armature of the DC motor and the main terminals of said bidirectional, controllable semiconductor means to the other side of said feedback resistor.

15. A circuit as recited in claim 14, wherein said feedback capacitor comprises a tantalum capacitor and said bidirectional, controllable semiconductor means comprises a Triac.

16. A circuit as recited in claim 14, further including a limit switch interposed in the connection between the armature and said bidirectional, controllable semiconductor means, said limit switch comprising two series branches, each series branch including a diode and a pair of limit switch contacts, wherein said diodes are oppositely poled.

* * * * *

UNITED STATES PATENT OFFICE
CERTIFICATE OF CORRECTION

Patent No. 3,628,116     Dated December 14, 1971

Inventor(s) Fritz K. Preikschat

It is certified that error appears in the above-identified patent and that said Letters Patent are hereby corrected as shown below:

In the Specification:

Col. 1, line 61, after "a" (first occurrence) delete -- c --.

Col. 4, line 68, after "open" insert -- If -- and change "It" to -- it --.

Col. 6, line 28, delete "$k_1A'$" and insert therefor -- $K_1A'$ --.

Col. 8, line 60, delete "OR" and insert therefor -- or --.

Col. 15, Table V, adjacent Component R48, "$100\Omega$" should be under Type and Value column.

Col. 16, line 15, after "to" delete "control" and insert therefor -- the minimum resolution of -- .

Col. 10, lines 49, "Qi" should be -- $Q_1$ --.

Signed and sealed this 20th day of June 1972.

SEAL)
Attest:

EDWARD M. FLETCHER, JR.
Attesting Officer

ROBERT GOTTSCHALK
Commissioner of Patents